United States Patent
Tanaka

(10) Patent No.: US 7,423,361 B2
(45) Date of Patent: Sep. 9, 2008

(54) VIBRATION WAVE MOTOR CONTROL APPARATUS, VIBRATION WAVE MOTOR CONTROL METHOD, PROGRAM, AND STORAGE MEDIUM

(75) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/837,844

(22) Filed: Aug. 13, 2007

(65) Prior Publication Data

US 2008/0048522 A1 Feb. 28, 2008

(30) Foreign Application Priority Data

Aug. 25, 2006 (JP) .............. 2006-229439

(51) Int. Cl.
*H01L 41/09* (2006.01)
(52) U.S. Cl. .................. 310/316.01; 310/317
(58) Field of Classification Search ............ 310/316.01, 310/317
See application file for complete search history.

(56) References Cited

U.S. PATENT DOCUMENTS

| | | | | |
|---|---|---|---|---|
| 4,740,726 A | * | 4/1988 | Umezawa ............. | 310/316.01 |
| 5,159,253 A | * | 10/1992 | Shimizu et al. ............ | 318/606 |
| 5,214,339 A | * | 5/1993 | Naito ..................... | 310/316.02 |
| 5,508,579 A | * | 4/1996 | Suganuma ............. | 310/316.02 |
| 5,563,478 A | * | 10/1996 | Suganuma ............. | 318/116 |
| 7,298,066 B2 | * | 11/2007 | Kawaguchi et al. .... | 310/316.01 |
| 2003/0127944 A1 | * | 7/2003 | Clark et al. ............ | 310/316.01 |
| 2004/0013420 A1 | * | 1/2004 | Hara ..................... | 396/55 |
| 2004/0026925 A1 | * | 2/2004 | Kong et al. ............ | 290/1 R |
| 2004/0169480 A1 | * | 9/2004 | Ueda et al. ............ | 318/114 |
| 2005/0116583 A1 | * | 6/2005 | Nishio et al. ........... | 310/317 |
| 2007/0029896 A1 | * | 2/2007 | Ha et al. ................ | 310/317 |
| 2008/0025713 A1 | * | 1/2008 | Yasuda ................. | 396/104 |

FOREIGN PATENT DOCUMENTS

JP 05-252765 9/1993

* cited by examiner

*Primary Examiner*—Thomas M Dougherty
(74) *Attorney, Agent, or Firm*—Cowan, Liebowitz & Latman, P.C.

(57) ABSTRACT

A vibration wave motor control apparatus which has a simplified construction and is reduced in cost. In a photographic apparatus including a lens, a lens position controller controls the position of the lens using a vibration wave motor driven by a drive voltage of a set frequency, and a drive-frequency controller controls the set frequency. The drive-frequency controller determines an estimated frequency based on a change in the position of a movable unit of the vibration wave motor determined from data inputted from an encoder, and based on the estimated frequency, calculates an updated value of the set frequency and inputs the same to the lens position controller.

12 Claims, 6 Drawing Sheets

VIBRATION WAVE MOTOR CONTROL APPARATUS, VIBRATION WAVE MOTOR CONTROL METHOD, PROGRAM, AND STORAGE MEDIUM

BACKGROUND OF THE INVENTION

1. Field of the Invention

The present invention relates to a vibration wave motor control apparatus, a vibration wave motor control method, a program, and a storage medium, and more particularly, to a vibration wave motor control apparatus and method for controlling a vibration wave motor adapted to be driven by a voltage of a set frequency, a computer-readable program for causing a computer to execute the vibration wave motor control method, and a computer-readable storage medium storing the program.

2. Description of the Related Art

A vibration wave motor is known, which is adapted to generate a vibration wave in an elastic body comprised of a piezoelectric element that vibrates when applied with a voltage, to thereby relatively move the elastic body and a movable unit disposed in contact therewith using a friction force produced therebetween.

Such a piezoelectric element has a resonance point (resonance frequency) that varies depending on environmental conditions such as temperature, humidity, load, etc. To stably operate the piezoelectric element, the frequency of the voltage applied to drive the piezoelectric element (hereinafter referred to as the "drive frequency") must be controlled to be always greater than the resonance frequency of the piezoelectric element.

For the drive frequency control, it has been proposed to use a monitor piezoelectric element, i.e., a further piezoelectric element adapted to monitor a vibration state of an elastic body of an ultrasonic motor, which is an example of a vibration wave motor (see, FIG. 1 of Japanese Laid-open Patent Publication No. 05-252765, for instance).

In that case, extra cost is added to provide the monitor piezoelectric element, which is solely used for the drive frequency control. In addition, a monitor signal processing circuit must be provided to process an output signal from the monitor piezoelectric element, resulting in increase in size and cost of a circuit board including a control circuit for the vibration wave motor.

SUMMARY OF THE INVENTION

The present invention provides a vibration wave motor control apparatus and method capable of simplifying the construction of the apparatus and reducing costs, a program causing a computer to implement the method, and a storage medium storing the program.

According to a first aspect of the present invention, there is provided a vibration wave motor control apparatus for controlling a vibration wave motor adapted to be driven by a voltage of a set frequency, comprising an estimation unit adapted to determine an estimated frequency based on a displacement of a movable part of the vibration wave motor, a calculation unit adapted to calculate a frequency difference between the estimated frequency and the set frequency, and a correction unit adapted to correct the set frequency based on the calculated frequency difference.

According to a second aspect of the present invention, there is provided a vibration wave motor control method for controlling a vibration wave motor adapted to be driven by a voltage of a set frequency, comprising an estimation step of determining an estimated frequency based on a displacement of a movable part of the vibration wave motor, a calculation step of calculating a frequency difference between the estimated frequency and the set frequency, and a correction step of correcting the set frequency based on the calculated frequency difference.

According to third and fourth aspects of the present invention, there are provided a program for causing a computer to implement the vibration wave motor control method according to the second aspect and a storage medium storing the program.

According to the present invention, an estimated frequency relating to a set frequency (drive frequency) of a voltage for use in driving a vibration wave motor is determined based on a displacement of a movable part of the vibration wave motor. Based on the estimated frequency, the drive frequency is corrected, making it possible to compute a shift in frequency used for drive frequency control. This eliminates the need of providing a monitor piezoelectric element for the drive frequency control.

Further features of the present invention will become apparent from the following description of exemplary embodiments with reference to the attached drawings.

DETAILED DESCRIPTION OF THE PREFERRED EMBODIMENT

The present invention will now be described in detail below with reference to the drawings showing a preferred embodiment thereof.

Figure 1:
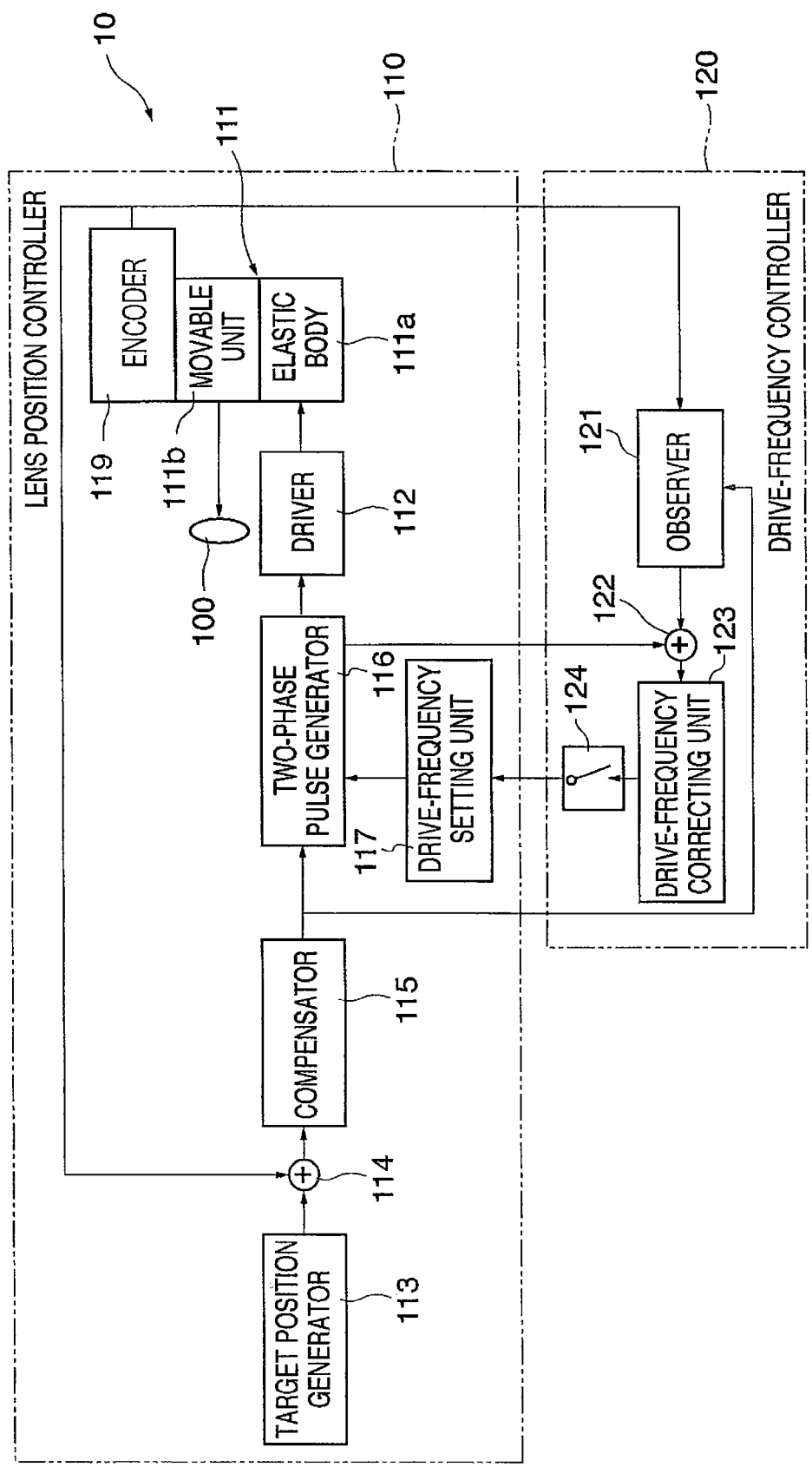
FIG. 1 is a block diagram schematically showing the construction of a photographic apparatus provided with a vibration wave motor control apparatus according to one embodiment of the present invention.

FIG. 1 is a block diagram schematically showing the construction of a photographic apparatus provided with a vibration wave motor control apparatus according to one embodiment of the present invention.

Referring to FIG. 1, the photographic apparatus 10 includes a photographic lens 100, a lens position controller 110 adapted to control the position of the lens 100 using a vibration wave motor 111, described below, and a drive-frequency controller 120 adapted to control the drive frequency of a voltage for use in driving the vibration wave motor.

The lens position controller 110 includes the vibration wave motor 111 for driving the lens 100, and a driver 112 for applying a drive voltage to the vibration wave motor 111 to thereby drive the vibration wave motor 111.

The vibration wave motor 111 is comprised of an elastic body 111a formed with two electrodes, and a movable unit 111b adapted to be in contact with the elastic body 111a. When applied with the drive voltage from the driver 112, the elastic body 111a vibrates. As a result, a vibration wave is generated. The elastic body 111a functions as a piezoelectric element, which is an example of an electromechanical energy conversion element. The movable unit 111b is coupled to the lens 100 directly or indirectly via a predetermined member, and the lens 100 is displaced in accordance with a movement of the movable unit 111b.

The lens position controller 110 includes a target position generator 113, an arithmetic unit 114, a compensator 115, a two-phase pulse generator 116, a drive-frequency setting unit 117, and an encoder 119 for detecting the position of the movable unit 111b. The target position generator 113, the arithmetic unit 114, the compensator 115, the two-phase pulse generator 116, and the driver 112 are connected in series with one another, as shown in FIG. 1. The drive-frequency setting unit 117 is connected to the two-phase pulse generator 116, and the encoder 119 is connected to the arithmetic unit 114.

The drive-frequency controller 120 includes an observer 121 connected to the compensator 115 and the encoder 119, an arithmetic unit 122 connected to the observer 121, a drive-frequency correcting unit 123 connected to the arithmetic unit 122, and a switch 124. The switch 124 has a movable contact thereof adapted to be connected to and disconnected from the drive-frequency correcting unit 123 and a stationary contact thereof connected to the drive-frequency setting unit 117. The arithmetic unit 122 is connected to the two-phase pulse generator 116.

Next, an explanation will be given of a lens position control process carried out by the lens position controller 110 shown in FIG. 1.

In the lens position control process, the target position generator 113 generates a target position to which the movable unit 111b is to be moved, and supplies target position data to the arithmetic unit 114. On the other hand, the encoder 119 detects the position of the movable unit 111b, and supplies actual position data to the arithmetic unit 114. Then, the arithmetic unit 114 calculates a difference between the target position generated by the target position generator 113 and the actual position of the movable unit 111b supplied from the encoder 119, i.e., a required drive distance for which the movable unit 111b is to be moved to reach the target position, and supplies data indicating the required drive distance to the compensator 115.

Subsequently, the compensator 115 calculates a phase difference Φ, described below, based on the drive distance inputted from the arithmetic unit 114, and supplies data indicating the calculated phase difference to the two-phase pulse generator 116. The two-phase pulse generator 116 generates two kinds of pulse signals, i.e., first and second pulse signals, which are described below with reference to FIG. 2, and supplies these pulse signals to the driver 112. The drive-frequency setting unit 117 sets, to the two-phase pulse generator 116, a drive frequency of two kinds of pulse signals to be generated by the two-phase pulse generator 116, as a set frequency F.

Figure 2:
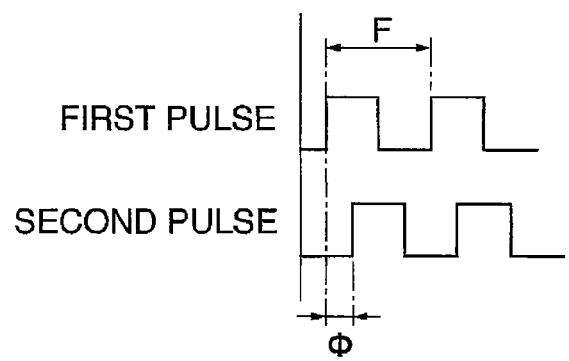
FIG. 2 is a timing chart showing two kinds of pulse signals generated by a two-phase pulse generator shown in FIG. 1.

FIG. 2 is a timing chart showing the two kinds of pulse signals generated by the two-phase pulse generator 116 in FIG. 1.

As shown in FIG. 2, the first and second pulse signals generated by the two-phase pulse generator 116 have the same pulse period, which corresponds to the set frequency F set by the drive-frequency setting unit 117. An initial value of the set frequency F (i.e., a reference drive frequency F) is set in advance to 175 kHz, for example, with reference to FIG. 3.

A phase difference Φ between the first and second pulse signals is inputted from the compensator 115. It is assumed here that the period of pulse is 360 degrees, and the phase difference Φ of 90 degrees is one-fourth of the pulse period. The phase difference Φ may be set to have a value falling within a range from minus 90 degrees to positive 90 degrees.

Referring to FIG. 1, the driver 112 generates two-phase drive voltages by switching a power source, not shown, in accordance with two types of pulse signals inputted from the two-phase pulse generator 116. When the drive voltages are applied to two electrodes of the elastic body 111a, the voltages at the electrodes increase. When applied with the two-phase drive voltages, the elastic body 111a makes vibration, whereby a vibration wave is generated. The movable unit 111b made in contact with the elastic body 111a moves relative to the vibrating elastic body due to a friction force produced therebetween. The encoder 119 detects the position of the movable unit 111b, and inputs data indicating the detected position to the arithmetic unit 114.

As described above, the lens position controller 110 feeds back to the arithmetic unit 114 data indicating the position of the movable unit 111b detected by the encoder 119, whereby the position of the movable unit 111b is controlled and hence the position of the lens 100 is controlled as designed or in accordance with the desired open loop transfer characteristic. Here, the open loop transfer characteristic indicates a characteristic of the open feedback loop in the lens position controller 110 with which the lens position controller 110 operates with the desired open loop transfer function.

Figure 5:
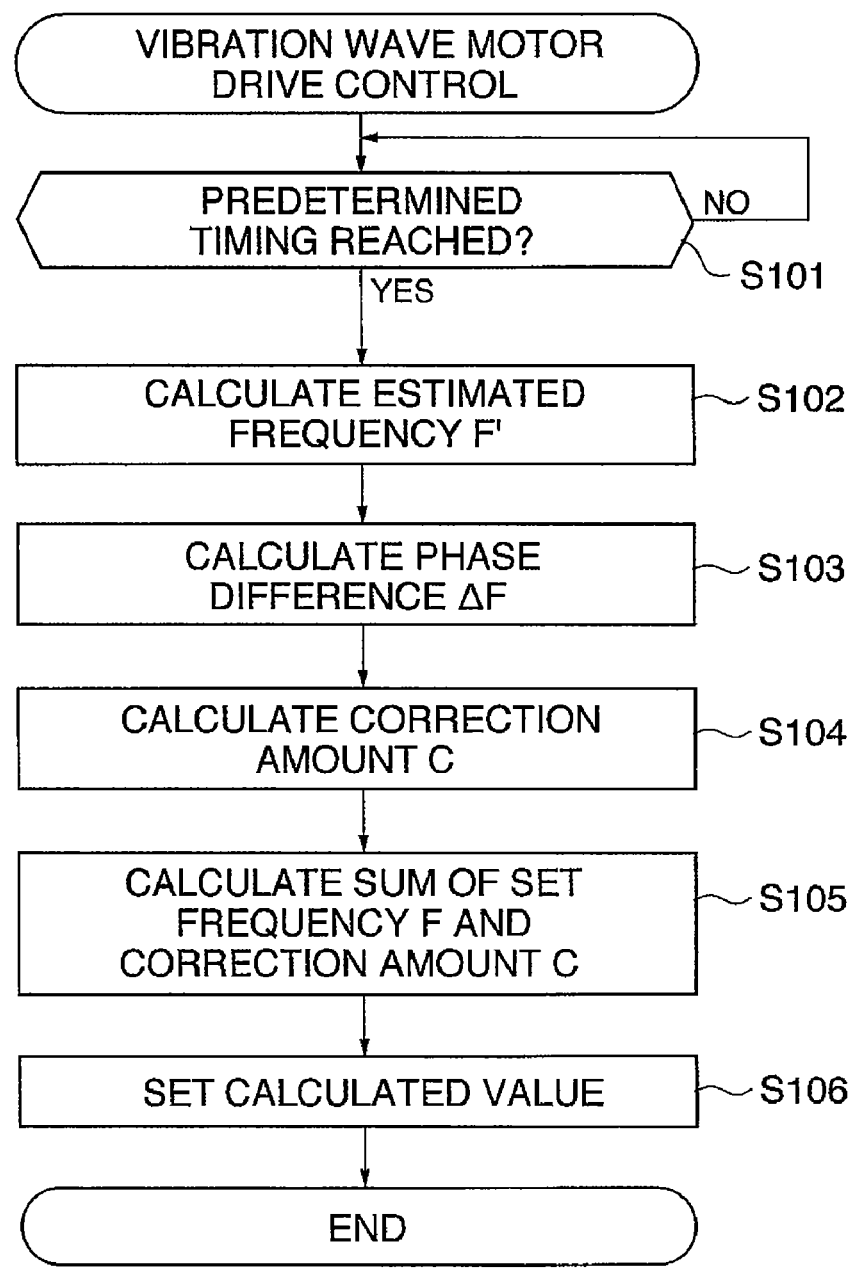
FIG. 5 is a flowchart showing a vibration wave motor drive control process implemented by a drive-frequency controller of the photographic apparatus shown in FIG. 1.

In the drive-frequency controller 120 shown in FIG. 1, various units thereof operate as described below, whereby a vibration wave motor drive control process in FIG. 5 is carried out as described below.

Based on the position (phase) of the movable unit 111b detected by the encoder 119, the observer 121 calculates an estimated frequency F', which is an estimated value of frequency of a vibration wave actually generated in the elastic body 111a of the vibration wave motor 111 and which is then inputted to the arithmetic unit 122. The estimated frequency F', which indicates an effective frequency of the set frequency F, becomes higher than the set frequency F when the vibration wave motor 111 generates a vibration wave having a frequency higher than the set frequency F (drive frequency).

The arithmetic unit 122 calculates a frequency difference ΔF between the estimated frequency F' inputted from the observer 121 and the set frequency F set in the two-phase pulse generator 116, and then inputs the same to the drive-frequency correcting unit 123.

Based on the frequency difference ΔF, the drive-frequency correcting unit 123 calculates a correction value C, and adds the calculated correction value C to the set frequency F set in the two-phase pulse generator 116. As a result, a value of the set frequency (hereinafter referred to as the "updated value"), which is to be inputted to the drive-frequency setting unit 117, is calculated.

The switch 124 is configured to be ON-OFF switched in predetermined timings (timing setting unit). When the switch 124 is ON, the updated value of the set frequency F calculated by the drive-frequency correcting unit 123 is inputted to the drive-frequency setting unit 117.

In response to this, the drive-frequency setting unit 117 of the lens position controller 110 renews a value of the set frequency F set in the two-phase pulse generator 116 to the updated value.

As described above, the drive-frequency controller 120 is configured to control the set frequency F of the drive voltage to be applied to the vibration wave motor 111.

Next, an explanation will be given of the velocity of the movable unit 111b driven by the driver 112 of the lens position controller 110.

Figure 3:
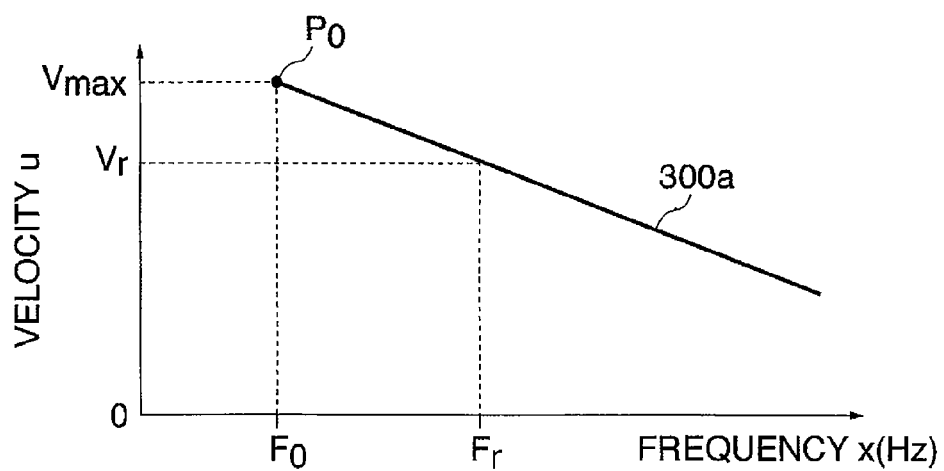
FIG. 3 is a view showing a relation between the velocity at which a movable unit of the vibration wave motor in FIG. 1 moves and the frequency at which an elastic body vibrates.

FIG. 3 is a view showing a relation between the velocity u at which the movable unit 111b of the vibration wave motor 111 in FIG. 1 moves and the frequency x at which the elastic body 111a vibrates.

In FIG. 3, the frequency x (Hz) of a vibration wave generated in the elastic body 111a is taken along abscissa, and the velocity u of the movable unit 111b is taken along ordinate. The velocity u may be represented by an arbitrary unit.

A calibration line 300a shown in FIG. 3 represents a maximum of the moving velocity u of the movable unit 111b observed when a vibration wave having a frequency x is generated in the elastic body 111a of the vibration wave motor 111. The maximum velocity u is represented as a function of frequency x as shown by equation (1) given below.

$$u=f(x) \quad (1)$$

As shown in FIG. 3, the maximum velocity u has a maximum value Vmax on a resonance point P0 on the calibration line 300a. On the line 300a, the higher the frequency x than the resonance frequency F0 corresponding to the resonance point P0, the lower the maximum velocity u than the maximum value Vmax. Therefore, the function in equation (1) can be regarded as a linear function having a coefficient corresponding to the inclination shown in FIG. 3. The drive-frequency setting unit 117 sets the set frequency F to have a value larger than the resonance frequency F0 of the elastic body 111a. As a result, even if the resonance point F0 of the elastic body 111a varies according to environmental conditions, the elastic body 111a can operate with stability.

It should be noted that the inclination of the linear function in FIG. 3 has a value unique to the elastic body 111a, such as for example, −0.01. In a case that the reference drive frequency Fr (the initial value of the set frequency F) is set to a value of 175 kHz, for example, if the velocity u of the movable unit 111b has a value of 100, then the linear function corresponding to the line 300a is represented by equation (2) shown below.

$$u=(175000-x)/100+100 \quad (2)$$

The calibration line 300a or the function representing the calibration line 300a (equation (1) or (2)) is used for setting the reference drive frequency Fr and stored in the compensator 115. If the set frequency F is nearly equal to its effective frequency (estimated frequency), the maximum velocity u of the movable unit 111b corresponding to the set frequency F can rapidly be calculated by substituting the set frequency F into the calibration line 300a or the function representing the same.

It is preferable that the calibration line 300a shown in FIG. 3 or the function representing the same (equation (1) or (2)) be stored in the observer 121 and/or the drive-frequency correcting unit 123.

Figure 4:
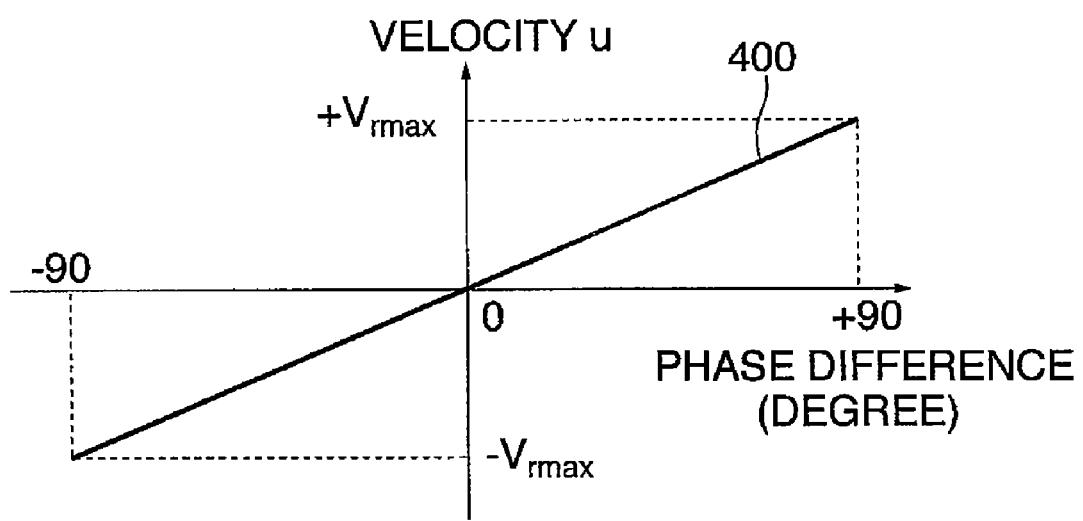
FIG. 4 is a view showing a relation between the phase difference shown in FIG. 2 and the velocity of the movable unit.

FIG. 4 is a view showing a relation between the phase difference Φ shown in FIG. 2 and the velocity u of the movable unit 111b.

In FIG. 4, the phase difference Φ (degree) between the first and second pulse signals shown in FIG. 2 is taken along abscissa, and the velocity u of the movable unit 111b is taken along the ordinate.

Referring to FIG. 4, a line 400 represents the velocity u of the movable unit 11b observed when the phase difference Φ changes in a 180 degree range from minus 90 degrees to plus 90 degrees, with the set frequency F kept constant at the reference drive frequency Fr.

As shown by the line 400 in FIG. 4, the velocity u of the movable unit 111b has a maximum value Vrmax when the phase difference Φ is plus 90 degrees, i.e., when the second pulse signal is ahead of the first pulse signal pulse by an amount of one-fourth of pulse period. In such a case, the movable unit 111b moves in a predetermined direction (hereinafter referred to as the "plus direction").

Also when the phase difference Φ is minus 90 degrees, i.e., when the second pulse signal is delayed behind the first pulse signal by an amount of one-fourth of the pulse period, the velocity u has its maximum value Vrmax. In such a case, the movable unit 111b moves in a direction (minus direction) opposite to the plus direction.

When the phase difference Φ is zero degree on the line 400, the velocity u becomes zero and the movable unit 111b is stopped from moving.

It should be noted that the maximum value Vrmax coincides with a reference velocity Vr corresponding to the reference drive frequency Fr in FIG. 3. Thus, the line 300 shown in FIG. 3 represents a relation between maximum velocity and frequency, which is observed when the phase difference Φ is 90 degrees in absolute value in FIG. 4.

As understood from FIG. 4, the velocity u can be represented as a function of the phase difference Φ (u=f(Φ)). The function representing the line 400 can be regarded as a linear function having a coefficient corresponding to the inclination in FIG. 4, which is represented by equation (3) shown below.

$$u=Vr\max\times(\Phi/90) \quad (3)$$

The calibration line 400 in FIG. 4 or the function representing the calibration line 400 (equation (3)) is stored in, for example, the compensator 115. By substituting a value of the phase difference Φ into the calibration line 400 or the function representing the same, the velocity u of the movable unit 111b corresponding to the phase difference Φ can be rapidly calculated. Furthermore, the maximum velocity u of the movable unit 111b at the phase difference Φ of 90 degrees in absolute value can also be rapidly calculated. The velocity u of the movable unit 111b varies within the range shown in FIG. 4, if the set frequency F is kept fixed at the reference drive frequency Fr.

The compensator 115 is configured to change the phase difference Φ to thereby change the velocity u of the movable unit 111b. For example, by changing the phase difference Φ such as to reverse the direction in which the second pulse signal moves relative to the first pulse signal, it is possible to reverse the direction of movement of the movable unit 111b. By making the phase difference Φ zero, the movable unit 111b can be stopped from moving. As described above, the lens position controller 110 controls the position of the movable unit 111b of the vibration wave motor 111, and hence controls the position of the lens 100.

It should be noted that the calibration line corresponding to the line 400 shown in FIG. 4 or the function representing the line 400 (equation (3)) is preferably stored in the observer 121.

As shown in FIGS. 3 and 4, the velocity u can be represented as a function of frequency x and phase difference Φ.

The line 300a in FIG. 3 and the line 400 in FIG. 4 each serve as a reference in designing the response characteristic of the compensator 115 such that the lens position controller 110 operates in accordance with the desired open loop transfer characteristic. In other words, so long as the vibration wave motor 111 operates at the reference drive frequency Fr set using the line 300a, it is possible for the lens position controller 110 to control the position of the lens 100 in accordance with the phase difference Φ calculated with reference to the line 400 in FIG. 4.

On the other hand, as shown in FIG. 1, the observer 121 of the drive-frequency controller 120 is connected to the compensator 115 and the encoder 119. As a result, the drive-frequency controller 120 can estimate a magnitude of variation in the resonance frequency F0 of the elastic body 111a, which is caused with a variation in environmental conditions.

Specifically, based on a positional displacement ΔL of the movable unit 111b represented by data inputted from the encoder 119 within a predetermined time period (hereinafter referred to as the "sampling time"), the observer 121 calculates an actual velocity V1 of the movable unit 111 (i.e., ΔL/sampling time). It should be noted that the sampling time is preferably set in accordance with the time interval of ON/OFF switching by the switch 124.

The observer 121 also calculates a maximum velocity V2 of the movable unit 111b at the set frequency F based on an actual velocity V1 and the phase difference Φ inputted from the compensator 115.

$$V2 = V1/(\Phi/90) \quad (4)$$

It should be noted that when the set frequency F is equal to the reference drive frequency Fr, the reference velocity Vr corresponds to the maximum velocity Vrmax.

The displacement ΔL represents a distance between two positions of the movable unit 111b detected by the encoder 119 at start and completion of the sampling time, i.e., a moving distance of the movable unit 111b during the sampling time.

Next, the observer 121 compares the maximum velocity V2 with the maximum velocity Vrmax. As a result of the comparison, if it is determined that the maximum velocity V2 is lower than the maximum velocity Vrmax, the estimated frequency F' becomes substantially higher than the set frequency F. The reason why the estimated frequency F' becomes higher than the set frequency F is that, as described later with reference to FIG. 7, the resonance point P0 shifts toward the lower frequency side with variation in environmental conditions. On the other hand, if the maximum velocity V2 becomes higher than the maximum velocity Vrmax, as described later with reference to FIG. 8, the resonance point P0 shifts toward the high frequency side with variation in environmental conditions, and the estimated frequency F' becomes substantially lower than the set frequency F.

Thus, in this embodiment, the observer 121 calculates the estimated frequency F', and based on the calculated estimated frequency F' the arithmetic unit 122 and the drive-frequency correcting unit 123 automatically calculate an updated value of the set frequency F. In the following, an explanation will be given of a vibration wave motor drive control process including the aforesaid process.

FIG. 5 is a flowchart showing a vibration wave motor drive control process implemented by the drive-frequency controller 120 of the photographic apparatus 10 shown in FIG. 1. This process is implemented when the vibration wave motor 111 is in a power ON state, i.e., when the lens position controller 110 is in operation.

Referring to FIG. 5, when a predetermined timing set on the switch 124 is reached (YES to step S101), the observer 121 calculates the estimated frequency F' (step S102). Specifically, an actual velocity V1 calculated from a positional displacement ΔL of the movable unit 111b is substituted into an inverse function $x = f^{-1}(u)$ of the function $u = f(x)$ representing the calibration line in FIG. 3, thereby calculating the estimated frequency F' $(= f^{-1}(V2))$.

In the next step S103, the arithmetic unit 122 calculates a frequency difference ΔF representing an error difference of the estimated frequency F' from the set frequency F (i.e., ΔF=F'−F). Based on the sign of the frequency difference ΔF, a magnitude comparison is made between values of the set frequency F and the estimated frequency F', whereby the observer 121 determines whether the resonance point F0 of the elastic body 111a has varied toward the higher frequency side or the lower frequency side according to the environmental conditions. Next, the drive-frequency correcting unit 123 multiplies the frequency difference ΔF by a correction gain (−1), thereby determining a correction value C (=−ΔF) (step S104).

In the next step S105, the drive-frequency correcting unit 123 adds the correction amount C of −5 kHz to the set frequency F of 175 kHz, thereby calculating the sum (F+C) of both. Next, in a step S106, the drive-frequency setting unit 123 inputs the value calculated in the step S105 to the drive-frequency setting unit 117 via the switch 124, thereby setting the same, as an updated value of the set frequency F, in the lens position controller 110, whereupon the present process is completed.

In response to the above, the drive-frequency setting unit 117 renews the set frequency F (for instance, the reference drive frequency Fr of 175 kHz) to the updated value inputted by the drive-frequency setting unit 123, whereupon the correction of the set frequency F is completed.

With the process of FIG. 5, the drive-frequency controller 120 automatically calculates an updated value of the set frequency F to be set to the two-phase pulse generator 116 by the drive-frequency setting unit 117. As a result, even if a shift in resonance point is caused, the lens position controller 110 is stably operable with the response characteristic of the compensator 115, i.e., with the as-designed open loop transfer characteristic. In other words, the drive-frequency controller 120 can compensate for a shift of the resonance point, which cannot be compensated for by the lens position controller 110.

In the following, a concrete example of the process in FIG. 5 will be described.

Figure 6:
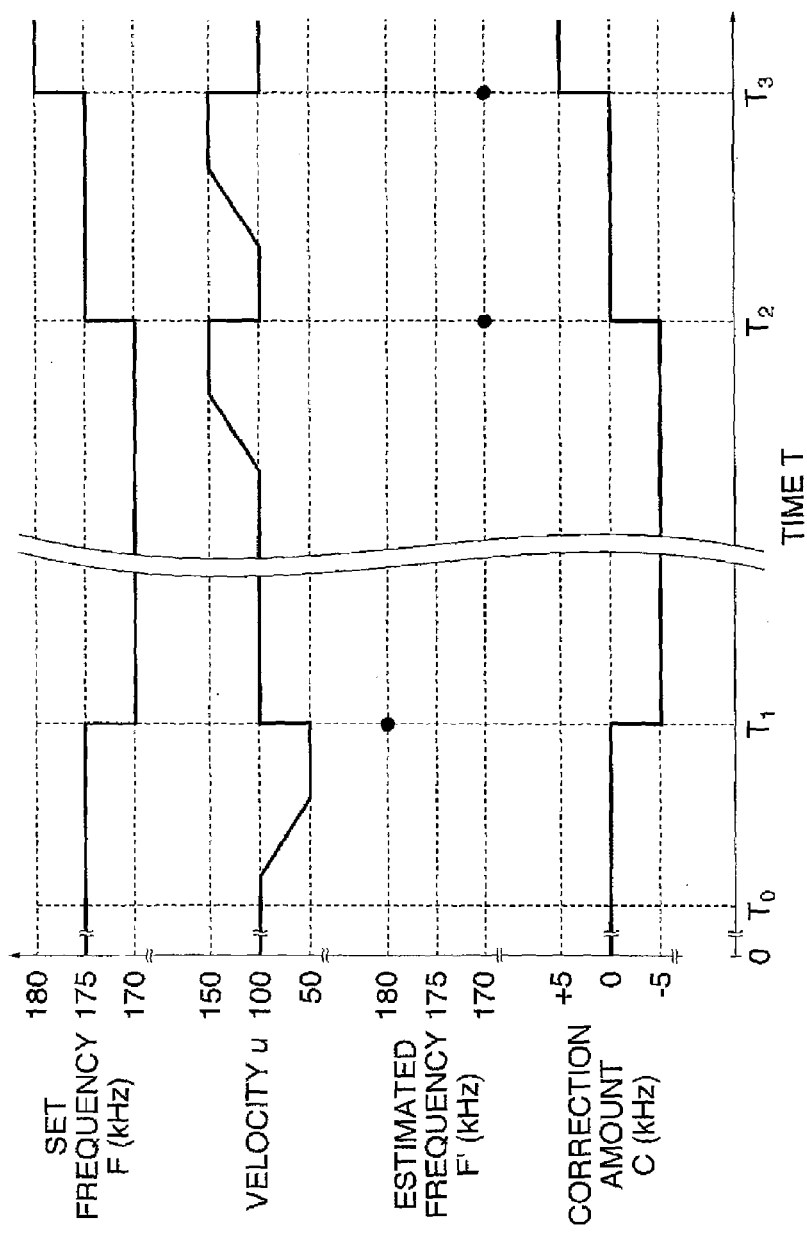
FIG. 6 is a timing chart showing an exemplary change in the set frequency, which is corrected by the process shown in FIG. 5.

FIG. 6 is a timing chart showing an exemplary change in the set frequency F, which is corrected by the process shown in FIG. 5. It should be noted that FIG. 6 also shows a change in the velocity u of the movable unit 111b, and changes in the estimated frequency F' of the elastic body 111a and the correction amount C used for correction of the set frequency F, which are calculated in the process in FIG. 5.

As shown in FIG. 6, the set frequency F is corrected in predetermined timings, specifically, at time points of T1, T2, and T3, by the process of FIG. 5 executed by the drive-frequency controller 120.

At the time point of T0, the set frequency F has a value equal to the reference drive frequency Fr (the initial value of the set frequency F set by the drive-frequency setting unit 117). It is assumed that the set frequency F has a value of Fa at the time point of T0. It should be noted that during a time period from the time at which the power is ON to the time point of T1, the drive-frequency controller 120 is adapted not to carry out an operation of correcting the set frequency F.

In the example shown in FIG. 6, the velocity u of the movable unit 111b gradually decreases during the time from the time point T0 to the time point T1. This indicates that, as will be described in detail later with reference to FIG. 7, the resonance point P0 has changed to a resonance point Pb on the lower frequency side according to the environmental conditions. During time periods between time points T1 and T2 and between time points T2 and T3, the velocity u of the movable unit 111b gradually increases, which indicates that the resonance point P0 has changed to a resonance point on the higher frequency side (for example, a resonance point Pc) according to the environmental conditions, as will be described with reference to FIG. 8.

At the time point of T0 in FIG. 6, the drive-frequency controller 120 does not start the operation of correcting the set frequency Fa, and hence the set frequency Fa (reference drive frequency Fr) is set to a value of 175 kHz, for instance. As understood by substituting a value of the reference drive frequency Fr, which is equal to the set frequency Fa, into equation (2), the phase difference Φ is 90 degrees and the velocity u has a value of 100.

At the time point of T1 in FIG. 6, the phase difference Φ is 90 degrees and the velocity u decreases to 50 although the set frequency Fa is maintained at 175 kHz. In the following, the process in FIG. 5 executed in such a case will be described with reference to FIG. 7.

Figure 7:
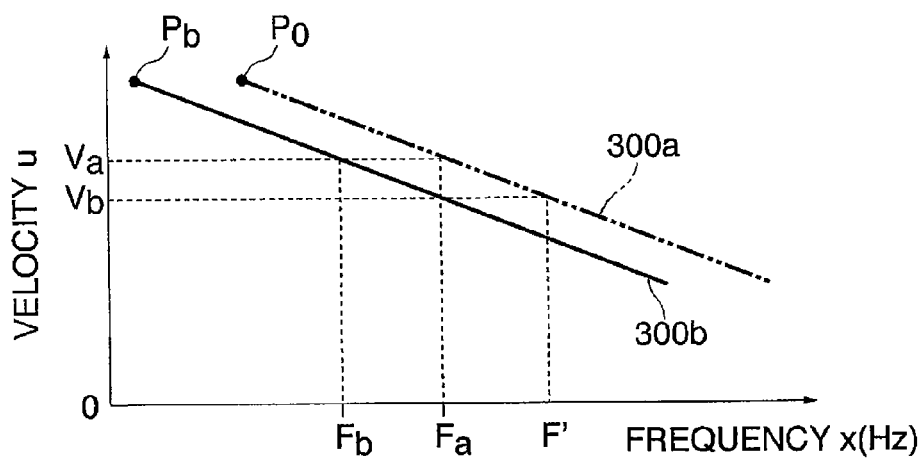
FIG. 7 is a view showing a relation between the frequency of the elastic body and the velocity of the movable unit at a time point T1 in FIG. 6.

FIG. 7 is a view showing a relation between the frequency x (Hz) of the elastic body 111a and the velocity u of the movable unit 111b at the time point T1 in FIG. 6. It should be noted that the calibration line 300a is also shown by a broken line in FIG. 7, the calibration line 300a being the same as that shown in FIG. 3 and corresponding to the time point T0 in FIG. 6.

As shown in FIG. 7, a maximum velocity Vb calculated from an actual velocity at the time point T1 in FIG. 6 is smaller than a maximum velocity Va corresponding to the set frequency Fa set at the time point T0. On the line 300a, the estimated frequency F' corresponding to the maximum velocity Vb is higher than the set frequency Fa.

If the velocity u of the movable unit 111b decreases and the estimated frequency F' increases in a predetermined time period even though the set frequency Fa is kept constant, then the observer 121 estimates that the resonance point of the elastic body 111a has shifted from P0 to Pb toward the lower frequency side, as shown in FIG. 7. In that case, the drive-frequency controller 120 carries out the process in FIG. 5 such that the calibration line 300a for use as the reference response characteristic of the compensator 115 is moved, by an amount corresponding to the shift of the resonance point, to a calibration line 300b which extends from the resonance point Pb in parallel to the calibration line 300a and on which the velocity u has a value of Va at a set frequency Fb.

Specifically, at the time point T1 in FIG. 6, the maximum velocity Vb of the movable unit 111b has a value of 50. From the line 300a, the observer 121 determines the frequency x of 180 kHz, as the estimated frequency F'. Subsequently, the set frequency Fa at the time point T0 (here, the reference drive frequency Fr of 175 kHz) is subtracted from the determined estimated frequency F', thereby calculating the frequency difference ΔF of +5 kHz.

For parallel movement of the calibration line 300a according to the calculated frequency difference ΔF of +5 kHz, the observer 121 calculates the correction amount C of −5 kHz. As a result, the function representing the calibration line 300b after the parallel movement is represented by equation (5) shown below.

$$u = (170000 - x)/100 + 100 \quad (5)$$

The parallel movement is equivalent to the step S105 in FIG. 5 of adding the correction amount of −5 kHz calculated at the time point T1 to the set frequency Fa of 175 kHz at the time point T0. As a result, an updated value of the set frequency Fa, which is equal to 170 kHz, is calculated as the set frequency Fb. As understood by substituting the set frequency Fb into the frequency x of equation (5), the velocity u can be made to have a value of 100.

By inputting from the drive-frequency controller 120 the calculated value of the set frequency Fb after correction to the lens position controller 110 that operates in accordance with equation (2), the velocity u of the movable unit 111b can be restored to have a value of 100.

At the time point T2 in FIG. 6, the set frequency Fa is maintained at 170 kHz, and the reference drive frequency Fr has a value of 175 kHz. Nevertheless, the phase difference Φ is 90 degrees and the velocity u increases to a value of 150. Also in this case, the set frequency Fa is corrected by the process in FIG. 5. It should be noted that in the process in FIG. 5, the correction amount C is calculated in reference to the calibration line 300a. Thus, at the time point T2, the correction amount is calculated to have a value of 0 Hz, and the reference drive frequency Fr is set as with the case at the time point T0. In response to this, the velocity of the movable unit 111b is resumed to have a value of 100.

At the time point of T3 in FIG. 6, the set frequency Fa is at a constant frequency of 175 kHz. Nevertheless, the phase difference Φ is 90 degrees and the velocity u increases to have a value of 150. In the following, the process in FIG. 5 executed in such a case will be described.

Figure 8:
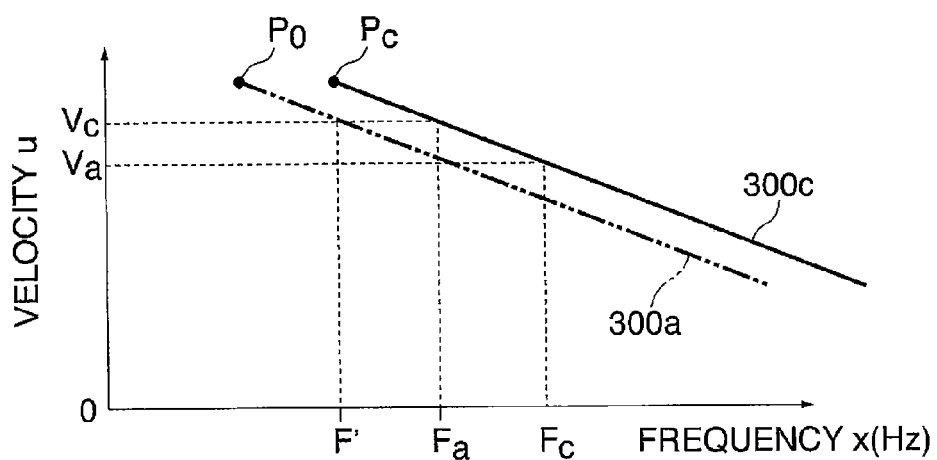
FIG. 8 is a view showing a relation at a time point T3 in FIG. 6 between the frequency of the elastic body and the velocity of the movable unit.

FIG. 8 is a view showing a relation at the time point T3 in FIG. 6 between the frequency x (Hz) of the elastic body 111a and the velocity u of the movable unit 111b. It should be noted that the calibration line 300a which corresponds to the time point T0 in FIG. 6 and which is the same as that shown in FIG. 3 is also indicated by a two-dotted chain line in FIG. 8.

As shown in FIG. 8, the maximum velocity Vc calculated from the actual velocity at the time point T3 in FIG. 6 is higher than the maximum velocity Va corresponding to the set frequency Fa set at the time point of T2. On the line 300a, the estimated frequency F' corresponding to the maximum velocity Vc has a value lower than the set frequency Fa.

In a case where the velocity u of the movable unit 111b decreases and the estimated frequency F' increases within a predetermined time period despite that the set frequency Fa is at a constant value, the observer 121 estimates that the resonance point of the elastic body 111a has shifted from P0 to Pc toward the higher frequency side, as shown in FIG. 8. In response to this, the drive-frequency controller 120 carries out the process in FIG. 5 such that the calibration line 300a for use as a reference response characteristic of the compensator 115 is moved, by an amount corresponding to the shift of the resonance point, to a calibration line 300c which extends from the resonance point Pc in parallel to the calibration line 300a and on which the velocity u has a value of Va at a set frequency Fc.

More specifically, at the time point of T3 in FIG. 6, the maximum velocity Vc of the movable unit 111b has a value of 150. From the line 300a, the observer 121 determines the frequency x of 170 kHz, as the estimated frequency F'. Subsequently, the set frequency Fa at the time point T2 (here, the reference drive frequency Fr of 175 kHz) is subtracted from the determined estimated frequency F', thereby calculating the frequency difference ΔF of −5 kHz.

For parallel movement of the calibration line 300a according to the calculated frequency difference ΔF of −5 kHz, the observer 121 calculates the correction amount C of +5 kHz. As a result, the function representing the calibration line 300c after the parallel movement is represented by equation (6) shown below.

$$u = (180000 - x)/100 + 100 \quad (6)$$

The parallel movement is equivalent to the step S105 in FIG. 5 of adding the correction amount of +5 kHz calculated at the time point T3 to the set frequency Fa of 175 kHz at the time point T2. As a result, a value (180 kHz) of the set frequency Fc after correction is calculated. Thus, the velocity u can be made to have a value of 100, as understood by substituting the frequency Fc into the frequency x of equation (6).

By inputting from the drive-frequency controller 120 the calculated value of the set frequency Fc after correction to the lens position controller 110 that operates in accordance with equation (2), the velocity u of the movable unit 111b can be restored to have a value of 100.

As described above, according to this embodiment, the photographic apparatus 10 shown in FIG. 1 includes the drive-frequency controller 120 adapted to correct, where required, the set frequency Fa to the set frequency Fb or Fc. As a result, even if the resonance point P0 of the elastic body 111a of the vibration wave motor 111 varies toward either the lower frequency side or the higher frequency side, the position of the movable unit 111b and hence the position of the lens 100 can be controlled with reliability. In other words, by solely adding a simple construction such as the drive-frequency controller 120 to the lens position controller 110, it is possible to operate the lens position controller 110 with the as-designed open loop transfer characteristic and drive the vibration wave motor 111 with the reference drive frequency Fr.

As a result, it is unnecessary to change the response characteristic of the compensator 115, making it possible to eliminate the need of changing the design of the calibration line 300a and the line 400. Thus, it is possible to suppress the increase in costs to a minimum.

It is also unnecessary to provide a monitor piezoelectric element and its monitor signal processing circuit which are required solely for the control of the set frequency (drive frequency), making it possible to achieve a reduction in costs as compared to the prior art. Furthermore, the drive-frequency controller 120 is extremely simple in construction as shown in FIG. 1, making it possible to miniaturize a circuit board as compared to the prior art and eliminate the need of laborious resource allocation, which the prior art requires.

It should be noted that although the above described embodiment employs the encoder 119 for detecting the position of the movable unit 111b, a sensor for detecting the velocity of the movable unit 111b may be employed instead of using the encoder 119.

In the above described embodiment, an inverse function of a function representing a relation between the set frequency and the velocity of the movable unit 111b is used in determining the estimated frequency. The function may be determined in advance by experiments. At that time, it is preferable to determine a function that indicates a relation between the set frequency and the movable unit velocity, with the pulse phase difference varying in a range from negative 90 degrees to positive 90 degrees. Furthermore, immediately after the start of power supply and before occurrence of increase in temperature, the function representing the relation between the velocity of the movable unit 111b and the set frequency may be corrected. In order to terminate such correction, it is enough to turn off the switch 124.

In the above described embodiment, it is assumed that the vibration wave motor 111 is used to drive the lens 100 of the photographic apparatus 10. The lens 100 may be at least any one selected from a group consisting of a zoom lens, a focus lens, and a shake correction lens. An object to be driven by the vibration wave motor 111 is not limited to an optical member such as the lens 100, but may be other member such as an aperture or a dark filter of the photographic apparatus 10. It is preferable that the direction in which an optical member is driven by the vibration wave motor 111 be either a horizontal panning direction or a vertical tilting direction.

In the above described embodiment, a case where the present invention is applied to a photographic apparatus has been described. However, this invention is not limited being applied to photographic apparatuses, but may be applied to any apparatus so long as it includes a vibration wave motor adapted to be driven by a voltage having a set frequency.

It is to be understood that the present invention may also be accomplished by supplying a system or an apparatus with a storage medium in which a program code of software, which realizes the functions of the above described embodiment, is stored and by causing a computer (or CPU or MPU) of the system or apparatus to read out and execute the program code stored in the storage medium.

In that case, the program code itself read from the storage medium realizes the functions of the above described embodiment, and therefore, the program code and the storage medium in which the program code is stored constitute the present invention.

Examples of the storage medium for supplying the program code include a floppy® disk, a hard disk, and a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2006-229439, filed Aug. 25, 2006, which is hereby incorporated by reference herein in its entirety.

What is claimed is:

1. A vibration wave motor control apparatus for controlling a vibration wave motor adapted to be driven by a voltage of a set frequency, comprising:

an estimation unit adapted to determine an estimated frequency based on a displacement of a movable part of the vibration wave motor;

a calculation unit adapted to calculate a frequency difference between the estimated frequency and the set frequency; and a correction unit adapted to correct the set frequency based on the calculated frequency difference.

2. The vibration wave motor control apparatus according to claim 1, wherein said correction unit corrects the set frequency so as to decrease when the estimated frequency is higher than the set frequency, and corrects the set frequency so as to increase when the estimated frequency is lower than the set frequency.

3. The vibration wave motor control apparatus according to claim 1, including:

a pulse generator unit adapted to generate two-phase pulses of the set frequency; and a driver adapted to generate a voltage of the set frequency using the two-phase pulses, wherein said estimation unit determines the estimated frequency based on a phase difference between the two-phase pulses and the displacement of the movable part of the vibration wave motor.

4. The vibration wave motor control apparatus according to claim 1, wherein the estimation unit determines the estimated frequency based on a calibration line that associates the displacement of the vibration wave motor with the set frequency.

5. The vibration wave motor control apparatus according to claim 4, wherein the estimation unit determines the estimated frequency using an inverse function of a function representing the calibration line.

6. A vibration wave motor control method for controlling a vibration wave motor adapted to be driven by a voltage of a set frequency, comprising:

an estimation step of determining an estimated frequency based on a displacement of a movable part of the vibration wave motor;

a calculation step of calculating a frequency difference between the estimated frequency and the set frequency; and a correction step of correcting the set frequency based on the calculated frequency difference.

7. The vibration wave motor control method according to claim 6, wherein in said correction step, the set frequency is corrected so as to decrease when the estimated frequency is higher than the set frequency, and is corrected so as to increase when the estimated frequency is lower than the set frequency.

8. The vibration wave motor control method according to claim 6, including:

a pulse generation step of generating two-phase pulses of the set frequency; and a voltage generation step of generating a voltage of the set frequency using the two-phase pulses, wherein in said estimation step, the estimated frequency is determined based on a phase difference between the two-phase pulses and the displacement of the movable part of the vibration wave motor.

9. The vibration wave motor control method according to claim 6, wherein in said estimation step, the estimated frequency is determined based on a calibration line which associates the displacement of the vibration wave motor with the set frequency.

10. The vibration wave motor control method according to claim 9, wherein in said estimation step, the estimated frequency is determined using an inverse function of a function representing the calibration line.

11. A program for causing a computer to execute the vibration wave motor control method as set forth in claim 6.

12. A computer-readable storage medium storing the program as set forth in claim 11.

* * * * *